July 25, 1967 — J. M. LEACH — 3,332,359
POWER AND FREE CONVEYORS
Filed April 20, 1965 — 3 Sheets-Sheet 1
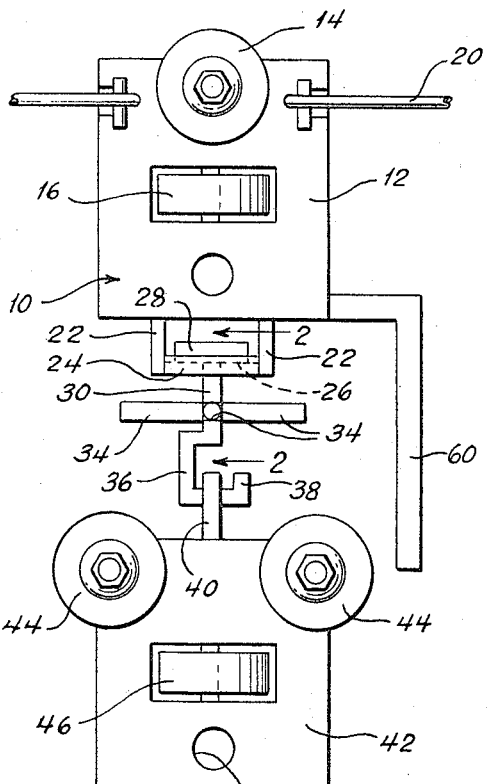
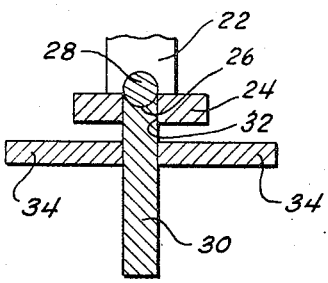
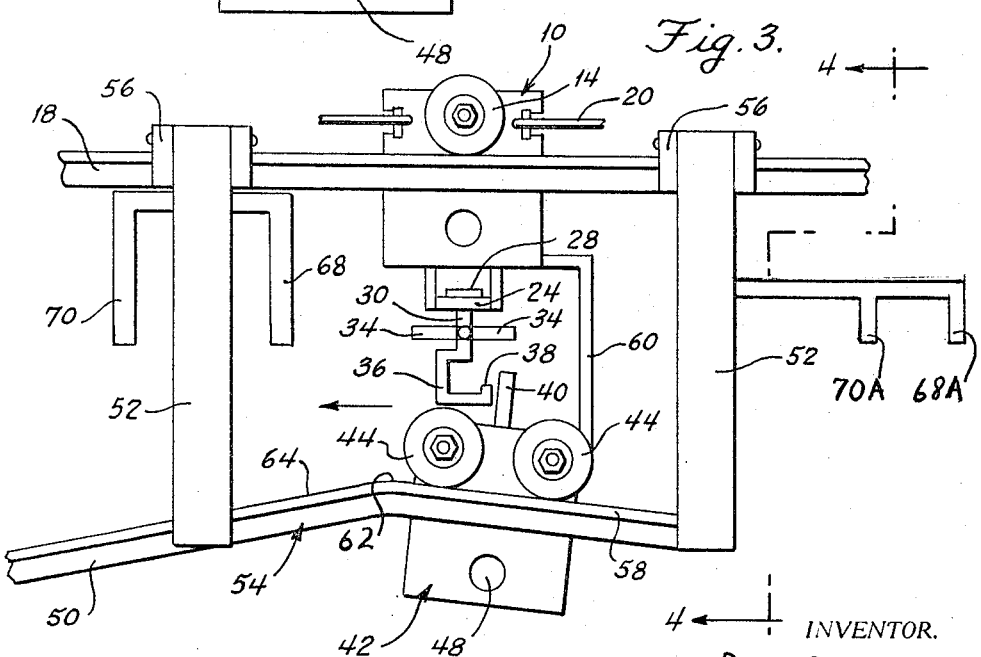
INVENTOR.
John M. Leach

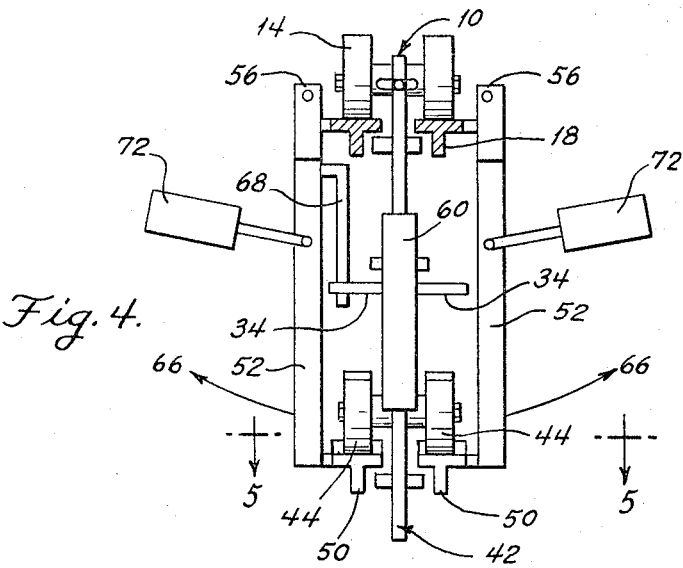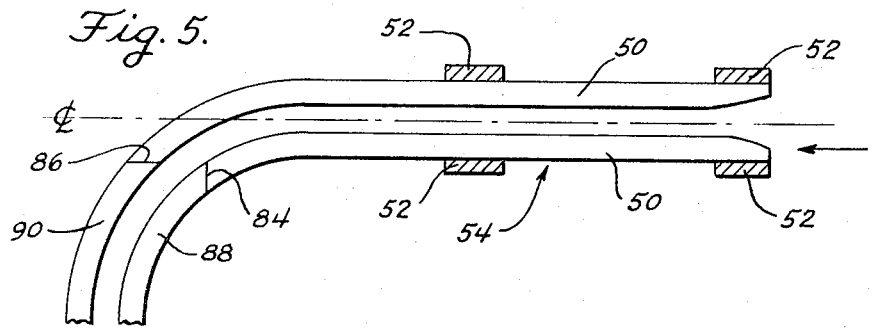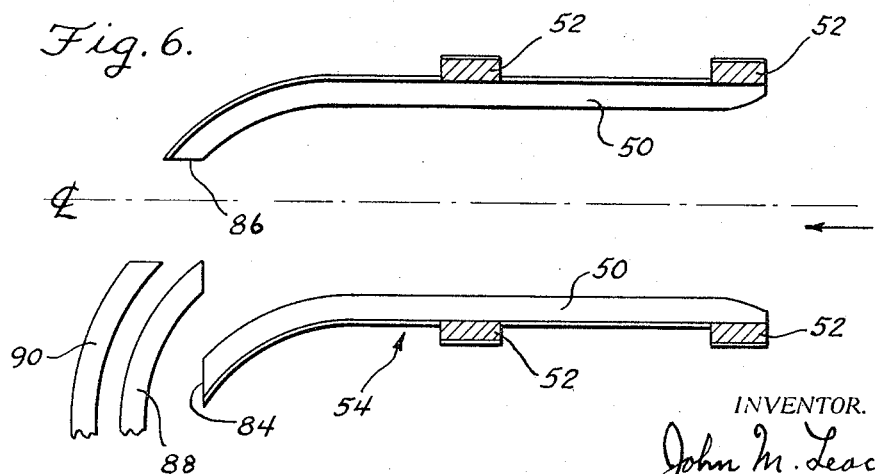

INVENTOR.
John M. Leach

United States Patent Office 3,332,359
Patented July 25, 1967

3,332,359
POWER AND FREE CONVEYORS
John M. Leach, Box 350, Belle Terre,
Port Jefferson, N.Y. 11777
Filed Apr. 20, 1965, Ser. No. 449,516
12 Claims. (Cl. 104—96)

ABSTRACT OF THE DISCLOSURE

This invention relates to a material conveyor combination in which the powered trolley carries the free trolley by means of a releasable, rotatable hook engaging a loop on the free trolley and a diverter comprising track sections which are pivotally mounted so as to be swung into the path of movement of the free trolley to disengage and divert the free trolley onto a separate track.

---

The present invention relates to conveyors. More particularly, it relates to conveyors of the overhead type commonly referred to as "power and free."

Power and free conveyors heretofore have consisted of a powered trolley conveyor with the trolleys moving on some type of track with certain of the trolleys provided with a mechanism which could engage a free trolley moving on an adjacent track so as to propel the free trolley along its track until it reached a switch which would direct it onto a side track and at the same time disengage it from the powered or pusher trolley. In this manner the load carried by the free trolley could be disassociated from the powered conveyor without stopping it. At some later time the free trolley would be suitably passed through another switch onto the track adjacent to the powered trolleys and would automatically again be picked up by the engaging mechanism of the next powered trolley passing by which was provided with such mechanism and again be propelled along by the powered trolley until such time as it again passed onto a preselected diverting switch.

This construction necessitated that the track for the free trolleys be coextensive with the powered conveyor track, and the switches being usually of the moving blade type were expensive to fabricate and inherently weak and therefore a constant trouble potential.

The power and free conveyor of the present invention differs essentially from the conventional power and free conveyor in that the free trolleys instead of just being pushed by the powered trolleys are actually individually carried by the powered trolleys at all times except when the free trolleys are on a side track or in the act of being directed onto or off of a side track. This results directly in a considerable savings in free trolley track; a much more positive and dependable engagement between the powered and free trolleys particularly on inclines and declines which can be made much steeper without creating any danger of separation of the powered and free trolleys accidentally; elimination of considerable wear on the free trolley wheels and bearings; the use of much less expensive, stronger and completely dependable diverter switches, and much better and more dependable transfer of the free trolleys around the turns leading onto side tracks, each of which features comprises an object of the present invention. Other objects and advantages of the present invention will become apparent to those skilled in the art upon recourse to the following description of the now preferred physical embodiment of the present invention.

The powered conveyor of the present invention can be any type of powered trolley conveyor but for the purpose of explanation only, the powered conveyor has been illustrated as the type described in U.S. Patent No. 2,884,116, issued Apr. 28, 1959, to John M. Leach for "Hook Conveyors."

Referring to the drawings, FIG. 1 is a side elevational view of a powered trolley carrying a free trolley;

FIG. 2 is a cross sectional view of a detail of the rotation mounting for the engagement hook taken substantially on the plane indicated by line 2—2 of FIG. 1;

FIG. 3 is a side elevational view of a free trolley in the act of being separated from a powered trolley at a diversion point;

FIG. 4 is an end view of the same subject matter as FIG. 3 and taken substantially on the plane indicated by line 4—4 of FIG. 3;

FIG. 5 is a cross sectional view showing the diverter track in the closed position which will cause all free trolleys which pass onto it while in this position to be disengaged from the powered trolleys and directed onto a side track. FIG. 5 is taken substantially on the plane indicated by line 5—5 of FIG. 4;

FIG. 6 is similar view to FIG. 5 but showing the diverter track in the open poistion in which it will have no effect upon free trolleys pasing through it;

Figure 7:
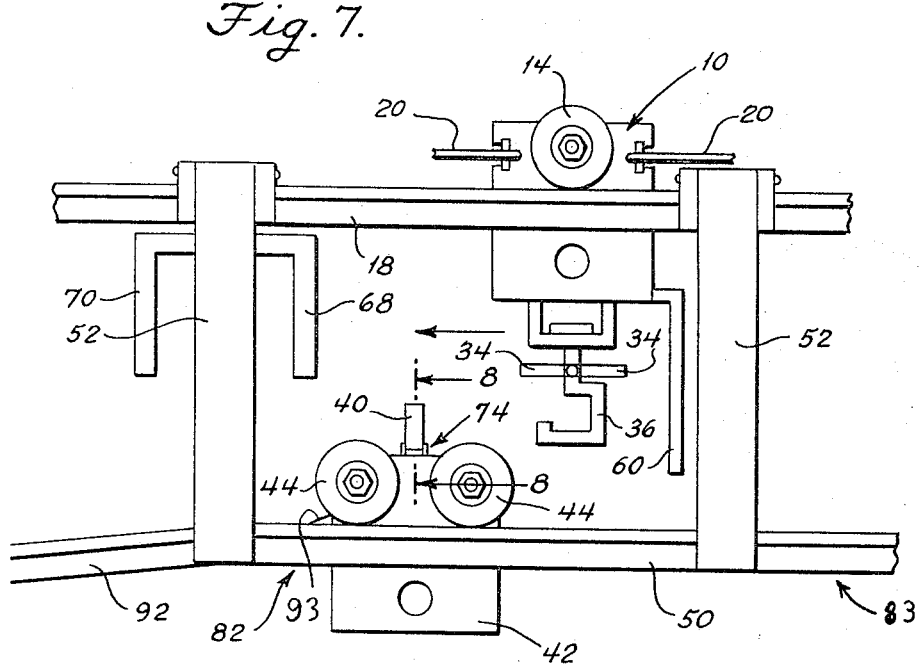
FIG. 7 is a side elevational view of a free trolley in the act of being picked up for carriage by a powered trolley.

Throughout the drawing figures only a single powered and free trolley combination is shown for the purpose of explanation but it will be understood that the powered trolleys exist in an endless series of any desired length and are propelled by a suitable drive unit which in and of itself forms no part of the present invention. In actual practice, each powered trolley or only a selected number will carry individual free trolleys.

Referring to the drawing figures, the powered trolleys are shown at 10 and preferably consist of plates 12 having vertical wheels 14, horizontal wheels 16, and connecting linkages 20, and travel along and are supported by track 18.

Instead of directly carrying any material load the powered trolleys each have depending legs 22 suitably connected to a bed plate 24 which is provided with a diametrically extending groove 26. A cylindrically shaped member 28 normally rests in the groove 26 and is suitably connected to a vertical shaft 30 which is journaled for both rotation and lineal movement in a bore 32 in the bed plate 24. The weight of the elements to be described subsequently normally retains the member 28 in the groove 26.

The shaft 30 is provided with rotation pins 34, preferably 4 in number, extending therefrom, and terminates in a hook shaped element 36 having an upturned end 38 which forms a keeper for the free trolley later described.

Each free trolley 42 is preferably constructed generally the same as the powered trolleys 10 except that they preferably have four vertical wheels 44 and no linkages. They do have vertical wheels spaced as far apart as practical to provide stability when running on their own wheels and the two wheels 46 in the horizontal position can if desired be increased to four to provide better guidance. The material load will usually be carried by some form of hook or other suspension medium connected into the plate opening 48.

The free trolleys 42 are each provided with a loop suspension hanger 40 which cooperates with the hook 36 on the powered trolleys to support and carry the free trolleys as shown in FIG. 1 in which all tracks have been omitted in order to more clearly illustrate the details of the powered and free trolleys. It will be noted that the keeper 38 on the hook 36 will effectively prevent accidental disengagement between the hook 36 and the loop 40 even if the free trolley 42 should rock appreciably relative to the powered trolley 10 on an incline or decline.

At each point where it is desired to selectively divert any one or more carried free trolleys from their respective powered trolleys a diverter 54, see FIG. 3, is provided. The diverter preferably comprises two track sections 50 carried by depending arms 52 which are pivotally connected as shown at 56 to some convenient supporting structure such as the powered trolley track 18. The pivotal connections 56 enable the track sections 50 to be placed in the closed position as shown in FIG. 5 or in the open position as shown in FIG. 6 by swinging the arms 52 either manually or by some suitable powered mover such as the two air cylinders 72 shown in FIG. 4. With the track sections in the open position as shown in FIG. 6, free trolleys carried by the powered trolleys just pass through the diverter 54 along the center line shown and are not contacted by or otherwise affected by the track sections 50. When it is desired that one or more free trolleys be diverted away from the powered conveyor at a given diversion point, the movable track sections 50 on the diverter at that point are moved into the closed position as shown in FIG. 5 by suitably actuating the air cylinders 72 to rock the arms 52 into the positions shown in FIG. 4. As the next free trolley carried by a powered trolley approaches the diverter 54 along the center line shown in FIG. 5 the wheels of the free trolley first contact an inclined section 58 of the track sections 50 which causes the free trolley and its loop 40 to be gradually elevated relative to the hook 36 until the loop 40 rises clear of the keeper 38 which permits the free trolley to roll backwards slightly as viewed in FIG. 3 until it is caught by a stop 60 carried by the pusher trolley to which it was just attached. The stop 60 continues to move the free trolley along until it passes over the apex 62 and starts down the declined section 64 when the force of gravity causes the free trolley to roll ahead of the powered trolley. The angle of decline is made such that the loop 40 passes under the hook 36 instead of again moving back onto the hook.

As shown in FIGS. 5 and 6 the straight sections of track 50 are provided with curved ends which terminate at edges 84 and 86 which firmly contact the ends of fixed curved track sections 88 and 90, respectively, when the diverter is in the closed position, FIG. 5, so that the free trolley traveling under the momentum gained on the decline 64 will pass rapidly around the turn onto the side track formed in continuation of the curves 88 and 90 and thus be positioned out of the way of succeeding free trolleys which will roll onto the side track behind the first free trolley if the diverter 54 is allowed to remain in the closed position or the succeeding free trolleys will pass on through the diverter if it is immediately moved to the open position and continue to be carried by the powered trolleys until they reach a diversion point where they are to be removed from the powered trolleys and at which point the diverter will have been moved into the closed position. It is to be understood that there is no limit on the number of diversion points with corresponding diverters employed and as few or as many free trolleys can be removed in succession at any given diversion point as desired. By the use of either mechanical or electrical controls which are a standard item of commerce for use with power and free conveyors and within themselves form no part of the present invention, each trolley (free) can be provided with a read-out control which can be preset for example when the free trolley is loaded so that its control will cooperate with a receiver control attached to each diverter so that each trolley will automatically actuate the preselected diverter coded on the read-out control to close it and remove that particular trolley and all others bearing the same code setting and remain open and thus not remove any other or more trolleys which are not set with the same code.

Referring again to FIG. 3, immediately after the free trolley just removed from powered trolley passes under the powered trolley and onto the side track the powered trolley continues on and a rotation member 34 carried by the hook shaft 30 strikes a projecting arm 68 carried by an arm 52 which causes the shaft 30 and hook 36 to rotate approximately 90 degrees. This rotation causes the cylindrical member 28 to move up and out of the groove 26. Further movement of the powered trolley causes a second rotation member 34 to contact a second projecting arm 70 likewise carried by the arm 52 which again rotates the shaft and hook 36 approximately 90 degrees or sufficiently for the cylindrical member 28 to start to settle back down into the groove 26 and the weight of the members 28, 30, 34 and 36 causes the member 28 to snap all of the way down into the groove 26 which positions the hook 36 exactly in the position shown in FIG. 7 which is a 180 degree rotation. The purpose of this rotation is to position the hook 36 so that it can automatically pick up a free trolley as will be later explained. It will be seen that the arm projections 68 and 70 can be effective to contact the rotation members 34 only when the diverter is in the closed position with the arms 52 in the position shown in FIG. 4. When the diverter 54 is in the open position with the arms 52 raised, the arms 68 and 70 will be raised well out of the path of the rotation members of any powered trolley which passes through the diverter without releasing a free trolley.

When it is desired to place a free trolley onto a powered trolley, the free trolley will be suitably released and permitted to roll, usually under the influence of gravity, onto a "connector" as shown in FIG. 7 and which is essentially of the same construction as the diverter 54 in that it is adapted to be opened and closed in the same manner and has curved ends on the track sections 50 with terminal edges corresponding to the edges 84 and 86 of the diverter and which cooperate with curved ends on the release end of the side track which correspond to the curved approach ends 88 and 90 on the side track. In the case of the connector 82, however, the cooperating curved sections are positioned at the end 83 of the connector which is approached by the powered trolleys instead of at the opposite end as is the case with the diverter. Also, the track sections 50 of the connector are substantially horizontal throughout their lengths except at the end 92 where they slope gently downwardly. A shallow stop 93 is usually positioned as shown in FIG. 7 on one or both track sections 50 to arrest movement of the free trolley when it rolls onto the connector and prevent it from traveling too far which could result in its falling off of the end of the track sections 50.

When a free trolley is in position on the connector as shown in FIG. 7, the hook 36 of the next approaching powered trolley, which has been turned into the pick-up position as previously explained, will pass into the loop 40 and first move the free trolley along so as to cause its wheels to pass up and over the shallow stop 93 and then pick up and fully support the free trolley as it is moved down the decline 92 which causes the free trolley to lower gradually and settle the loop 40 onto the hook 36.

It will now be necessary to again rotate the hook 36 180 degrees as explained above in order to place the hook into the position shown in FIG. 3 where the loop 40 can again be disconnected from it when the free trolley passes into the first closed diverter. When there is no objection to rotating the entire free trolley as well as any material load it might be carrying, this 180 degree rotation can be effected by a pair of arm projections placed just ahead of the diverter which is to be operative upon the free trolley just picked up and preferably also carried by arm 52 of the diverter as shown at 68A and 70A in FIG. 3 so that these arm projections will be retracted when the diverter carrying them is opened and thereby rendered ineffective except whenever the diverter carrying them is also effective.

Figure 8:
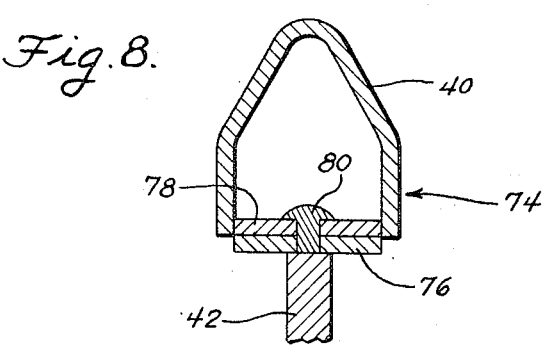
FIG. 8 is a cross sectional view of a detail of the rotation mounting for the loop on a free trolley and is taken substantially on the plane indicated by line 8—8 of FIG. 7.

In many instances, however, for various reasons such as bulky loads being carried by the free trolleys, space limitations, etc., it will be undesirable to rotate the entire free trolley and its load. In such instances the loop 40 will be attached to the free trolley 42 by a swivel connection such as that shown in FIGS. 7 and 8. This swivel assembly 74 can consist of a plate 76 rigidly connected to the plate of the free trolley 42 and provided with a headed pivot stud 80 which extends through a suitable aperture in a rotatable plate 78 to which the loop 40 is rigidly suitably connected. When such a swivel assembly is employed, the projection arms 68 and 70 will preferably be carried directly by the connector as shown in FIG. 7. This is so that the 180 degree rotation of the hook 36 as well as the loop 40 can be effected before the free trolley leaves the connector and while the free trolley will be held from any rotation by the track sections 50. Also, when the connector 82 is opened and rendered ineffective the arms 68 and 70 will likewise be rendered ineffective. It will be understood that under the conditions just described each connector employed in the entire system will be provided with its own arms 68 and 70 which will be effective only when the carrying connector is effective. In this manner it will be impossible for any projection arms to be effective when they should not be.

Throughout this specification when it is stated that the free trolley is directed by a diverter away from the powered conveyor and onto a side track, it is to be understood that the "side track" can be any track and the diversion of the free trolley onto it can be for any purpose. For example, the side track can be a receiving or storage area or a part of such an area where it is possible by means of the present invention to automatically remove all green items from the main powered conveyor and assemble them on one side track; all red items on another side track; all blue items on a third side track, etc. without limit.

Also, the side track or tracks can be assembly areas where parts are placed on the carried items or paint finishing areas where the carried items are either manually or automatically sprayed with or dipped in paint, etc. or packing areas where the items are removed and packed for shipment.

Furthermore, a side track can be a means of transferring items from one powered conveyor to another in that free trolleys can be diverted from powered conveyor onto a side track and then connected from the side track onto a different powered conveyor. There is no limitation upon how many such transfers can be made so as to flexibily interconnect any number of separate power conveyors or system desired.

The foregoing description of the preferred embodiments of the present invention is to be construed as descriptive and illustrative but not limitative because many changes and modifications can be made in the physical structure disclosed without departing from the spirit and scope of the present invention.

The invention having been described, what is claimed is:

1. A material conveyor comprising a movable trolley, a track along which said trolley moves, a hook, a rotatable connection between said hook and trolley whereby the hook can be rotated to position the open part of the hook in different positions in the horizontal plane, a loop carried by said hook, a second trolley, a rotatable connection between the loop and second trolley whereby the hook and loop can be rotated without creating relative rotation between the two trolleys, and a track for the second trolley interposed in the path of movement of the second trolley when carried by the first trolley so as to receive and support the second trolley at a selected point.

2. A material conveyor comprising a movable trolley, a track along which said trolley moves, a releasable suspending means connected to said trolley, a separate trolley suspended by said means, a track adapted to support said separate trolley at selected times, a diverter comprising track sections, a pivotal mounting for each track section positioned so that the track sections can be swung into the path of movement of the separate trolley while being supported by the movable trolley through the releasable suspending means to intercept the movable trolley, remove it from the suspending means and divert it onto its track.

3. A material conveyor comprising a movable trolley, a track along which said trolley moves, one part of a releasable suspending means carried by said movable trolley, a separate trolley, a track adapted to support said separate trolley at selected times, a second part of said releasable suspending means carried by said separate trolley so that when said releasable suspending means parts are in cooperative engagement the movable trolley can support and carry the separate trolley, a diverter comprising track sections, a pivotal mounting for each track section positioned so that the track sections can be swung into the path of movement of said separate trolley while being carried by said movable trolley through the releasable suspending means to intercept the separate trolley, remove it from the movable trolley and divert it onto its track.

4. A material conveyor comprising a movable trolley, a track along which said movable trolley moves, a hook suspended beneath said movable trolley, a separate trolley, a track adapted to support said separate trolley at selected times, a loop connected to said separate trolley so that when the loop is on the hook the movable trolley can carry the separate trolley, a connector comprising track sections, a pivotal mounting for each track section positioned so that the track sections can be swung into the path of movement of said movable trolley, receive said separate trolley from its track and connect the loop onto the hook as the movable trolley passes to enable the movable trolley to pick up and carry the separate trolley.

5. A material conveyor comprising a movable trolley, a track along which said movable trolley moves, a hook suspended beneath said movable trolley, a separate trolley, a track adapted to support said separate trolley at selected times, a loop connected to said separate trolley so that when the loop is on the hook the movable trolley can support and carry the separate trolley, a diverter comprising track sections, a pivotal mounting for each track section positioned so that the track sections can be swung into the path of the separate trolley when being carried by the movable trolley to intercept said separate trolley, remove it from the movable trolley and divert it onto its track, and a connector comprising track sections, a pivotal mounting for each track section positioned so that the track sections can be swung into the path of movement of said movable trolley, receive said separate trolley from its track and connect it onto the movable trolley as it passes to be carried thereby.

6. A material conveyor comprising a movable trolley, a track along which said movable trolley moves, a hook disposed beneath said movable trolley, a pivotal connection between said hook and movable trolley which enables the hook to be rotated so as to position the open section of the hook in different positions in the horizontal plane, a separate trolley, a track adapted to support said separate trolley at selected times, a loop connected to said separate trolley so that when the loop is on the hook the movable trolley can carry the separate trolley, means to rotatably position the hook so that the open section is facing opposite to the direction of travel of the separate trolley when carried by the movable trolley, a diverter comprising track sections, a pivotal mounting for each track section positioned so that the track sections can be swung into the path of movement of the separate trolley when carried by the movable trolley to intercept said separate trolley, remove it from the hook and divert it onto its track.

7. A material conveyor comprising a movable trolley, a track along which said movable trolley moves, a hook disposed beneath said movable trolley, a pivotal connection between said hook and movable trolley which enables the hook to be rotated so as to position the open section of the hook in different positions in the horizontal plane, a separate trolley, a track adapted to support said separate trolley at selected times, a loop connected to said separate trolley so that when the loop is on the hook the movable trolley can carry the separate trolley, means to rotatably position the hook so that the open section is facing opposite to the direction of travel of the separate trolley when carried by the movable trolley, a diverter comprising track sections, a pivotal mounting for each track section positioned so that the track sections can be swung into the path of movement of the separate trolley when carried by the movable trolley to intercept said separate trolley, remove it from the hook and divert it onto its track, means to rotatably position said hook so that the open section is facing in the direction of travel of the movable trolley when it is not carrying the separate trolley, and a connector comprising track sections, a pivotal mounting for each track section positioned so that the track sections can be swung into the path of movement of the movable trolley, receive said separate trolley from its track so that the hook will pass into the loop of the separate trolley as the movable trolley passes it and thus connect the separate trolley to the movable trolley to be carried thereby.

8. A material conveyor as claimed in claim 7 in which the diverter track sections include an incline which is first contacted by the separate trolley and which cause the separate trolley to rise and cause the hook to slip the loop off of it which enables the separate trolley to roll backwards away from the hook, a depending stop arm carried by the movable trolley which catches the separate trolley and again moves it ahead, a declined area in each track section onto which the separate trolley is pushed by the stop arm and down which the separate trolley rolls under the force of gravity beneath the hook and onto its track section.

9. A material conveyor as claimed in claim 8 further characterized by the loop being connected to the separate trolley by a swivel connection.

10. A material conveyor as claimed in claim 7 further characterized by power means for swinging the pivoted track sections of the diverter into and out of operative position.

11. A material conveyor as claimed in claim 7 further characterized by power means for swinging the pivoted track sections of the connector into and out of operative position.

12. A material carrying conveyor comprising a track, a first trolley movable along said track, a vertically extending hook rotatably connected under said trolley so that the open part of said hook can be directed either forwards or backwards relative to the direction of travel of the trolley, a second trolley, a suspension loop connected to said second trolley for coaction with said hook to suspend said second trolley from said first trolley, a diverter having track sections movably mounted so as to be positioned in the path of movement of and intercept said second trolley when suspended from said first trolley, and means for rotating said hook with the open part directed backwards relative to the direction of travel of the trolleys before said second trolley reaches said diverter.

References Cited
UNITED STATES PATENTS

| | | | |
|---|---|---|---|
| 451,602 | 5/1891 | Richardson | 104—96 |
| 1,222,041 | 4/1917 | Shaw | 104—107 |
| 1,778,484 | 10/1930 | Costa | 104—88 X |
| 1,875,966 | 9/1932 | Webb et al. | 104—100 |
| 2,344,155 | 3/1944 | McBride et al. | 104—91 |
| 2,840,005 | 6/1958 | Henderson et al. | 104—103 X |

ARTHUR L. LA POINT, *Primary Examiner.*

J. E. BABER, *Assistant Examiner.*